(12) United States Patent
Kim et al.

(10) Patent No.: US 8,036,298 B2
(45) Date of Patent: Oct. 11, 2011

(54) APPARATUS AND METHOD OF ERROR VECTOR MEASUREMENT FOR DIGITAL AND MULTIPLE-INPUT MULTIPLE OUTPUT IMO COMMUNICATION SYSTEMS

(75) Inventors: Pansop Kim, Torrance, CA (US); Jeng-Hong Chen, Temple City, CA (US)

(73) Assignee: Integrated System Solution Corp., Hsinchu (TW)

( * ) Notice: Subject to any disclaimer, the term of this patent is extended or adjusted under 35 U.S.C. 154(b) by 947 days.

(21) Appl. No.: 11/971,095

(22) Filed: Jan. 8, 2008

(65) Prior Publication Data

US 2009/0175181 A1  Jul. 9, 2009

(51) Int. Cl.
*H04B 7/02* (2006.01)
*H04L 1/02* (2006.01)

(52) U.S. Cl. ........ 375/267; 375/299; 375/347; 370/334; 455/101

(58) Field of Classification Search ............... 375/267, 375/347, 299; 455/101; 370/334
See application file for complete search history.

(56) References Cited

U.S. PATENT DOCUMENTS

| | | | | |
|---|---|---|---|---|
| 7,702,048 B2 * | 4/2010 | Guess et al. | ................... | 375/346 |
| 2008/0207143 A1 * | 8/2008 | Skarby et al. | ................... | 455/103 |

OTHER PUBLICATIONS 802.11 Working Group of the 802 Committee, "Wireless LAN Medium Access Control (MAC) and Physical Layer (PHY) specifications: Amendment: Enhancements for Higher Throughput," IEEE P802.11n/D2.00, Feb. 2007.
Stephens, "IEEE P802.11 Wireless LANs," IEEE 802.11-03/814r31, pp. 1-18, Jul. 2004.

* cited by examiner

*Primary Examiner* — Ted Wang
(74) *Attorney, Agent, or Firm* — Muncy, Geissler, Olds & Lowe, PLLC

(57) ABSTRACT

The present invention discloses an effective apparatus and method to measure the received signal quality for digital communication systems by measuring error vector measurement (EVM) with embedded EVM measurement block in receivers. The distinction of the present invention is that the $EVM_{SIG}$ and the $EVM_{DATA}$ are measured in the receiver for the SIGNAL fields and DATA fields, respectively. $EVM_{SIG}$ is a good indicator for one spatial stream and $EVM_{DATA}$ is a good indicator for current multiple streams. The receiver determines the optimum number of spatial data streams for feedback to the transmitter based on the combinations of $EVM_{SIG}$ and $EVM_{DATA}$ with or without other algorithms such as analysis on periodically requested sounding packet. The receiver also determines the optimum modulation and coding schemes for feedback based on the EVM measurements.

24 Claims, 12 Drawing Sheets

FIG. 9 Max throughput mode

FIG. 10 Normal mode

FIG. 11 Power saving mode

APPARATUS AND METHOD OF ERROR VECTOR MEASUREMENT FOR DIGITAL AND MULTIPLE-INPUT MULTIPLE OUTPUT IMO COMMUNICATION SYSTEMS

BACKGROUND OF THE INVENTION

1. Field of the Invention

The present invention relates generally to communication systems, and more particularly to the apparatus and method of error vector measurement (EVM) for the production line testing for general digital communication systems and the rate adaptation for multiple-rate communication systems.

2. Background Art

For communication systems, signal quality measurements are important for several reasons. One of the reasons is the production line testing (PLT). PLT is required to determine whether every component in a transmitter (Tx) and a receiver (Rx) works correctly. Good measured signal qualities with given conditions guarantee that PLT is passed for those conditions. Another reason is that this measured signal quality may be used as an indicator of the current physical channel condition including Tx and Rx distortions. In other words, by measuring the signal quality, the supported data rates for a wireless channel can be easily accessed.

Instant signal quality measurements are important especially for wireless communication systems that support multiple data rates. For example, wireless multiple-input multiple-output (MIMO) systems, such as IEEE 802.11n [1], naturally have large set of data rates. Due to the time and/or range variation of the wireless channels and a large set of data rates, it is important to find an optimum data rate on the current channel condition.

In IEEE 802.11n, the data rates are varied with the bandwidth, the number of spatial data streams and each stream's modulation and coding rate (MCS). Since the number of spatial data streams and each stream's MCS can be easily changed during connection, throughput may be optimized by adapting data rate with instantly measured signal quality feedback from the receiver. Rate adaptation is a mechanism to select an optimum data rate supported on the current channel condition to maximize the data throughput.

Received signal-to-noise ratio (SNR) is one of the possible indicators for decoded signal qualities. However, received SNR alone is not a good indicator especially for wireless multiple-input multiple output (MIMO) systems and most of the time can not be obtained easily at the receiver. Interference from the other spatial data streams may be also considered to determine the optimum transmit data rates. That is why signal-to-interference and noise ratio (SINR) may be a better indicator for MIMO systems. Unfortunately, it is not simple to calculate the received SNR or SINK because the received signal is the combination of the signal, the interference and the noise. The signal, the interference and the noise are hard to separate since they are unknown until correct decoding.

Because of this difficulty, in some rate adaptation algorithms, SNR (or SINR) is replaced with error vector measurement (EVM). EVM is the average distance between the received signal points and the closest constellation points. It is much simpler to measure EVM because the closest constellation points can be instantly determined with simple operations. The EVM and SNR (or SINK) are not identical, but closely related. That is, The EVM is also a good indicator for decoded signal qualities.

On the EVM, U.S. Pat. No. 20070041322 provided by to Choi et al., entitled "Rate adaptation using semi-open loop technique", discloses that EVM is used to indicate the channel condition and transmitter characteristics and thus used for rate adaptation. U.S. Pat. No. 6,922,549 issued to Lyons et al., entitled "Error vector magnitude selection diversity metric for OFDM", discloses EVM is used for antenna selection, and the preamble EVM used for intra-packet antenna selection is mentioned. U.S. Pat. No. 20050163252 provided by to McCallister et al., entitled "Transmitter predistortion circuit and method therefor", discloses that EVM is used to calibrate the predistortion circuits of the transmitter. U.S. Pat. No. 20050163252 provided by to Sun et al., entitled "Multiple-input multiple output system and method", discloses a MIMO system that used channel estimation and pilot EVM for feedback information in a closed-loop optimization. U.S. Pat. No. 20050163252 provided by to Walvis et al., entitled "Apparatus and method for simultaneous testing of multiple orthogonal frequency division multiplexed transmitters with single vector signal analyzer", discloses a apparatus and method for testing signals from two or more orthogonal frequency division (OFDM) transmitters simultaneously with a single vector signal analyzer. However, the aforementioned disclosures uses expensive high-precision devices with pre-calibrated Rx units in transmit to achieve sufficient accuracy tests. According to the above problems, therefore it is needed to provide a low cost testing and Rx unit, which can save time since testing simultaneously multiple transmitters will be more affordable. In the present invention, a novel apparatus and method of error vector measurement (EVM), improving the rate adaptation, for the production line testing for general digital communication systems and the rate adaptation for multiple-rate communication systems is proposed.

BRIEF SUMMARY OF THE INVENTION

It is an objective of the present invention to provide an effective apparatus to measure the received signal quality for digital communication systems by measuring error vector measurement (EVM) with embedded EVM measurement block in receivers.

It is another objective of the present invention to provide an effective method to measure the received signal quality for digital communication systems by measuring error vector measurement (EVM) with embedded EVM measurement block in receivers.

These measured EVM may be used for many applications including production line testing and rate adaptation for systems with multiple rates. These EVM blocks may be applied to any digital communication systems.

To achieve the above objectives, the present invention in one embodiment is an apparatus and method for production line testing for both transmitters and receivers with EVM measurement blocks embedded in receivers. Production line test of the transmitter modulation accuracy is performed by connecting the transmitters via cable to a pro-calibrated Rx golden unit that has sufficient accuracy. Production line test of the receiver performance is also performed by connecting the receivers to a pre-calibrated Tx golden unlit.

In another embodiment, the present invention is an apparatus and method improving the rate adaptation in digital communication systems that support multiple rates. A transmitting station transmits data streams to a receiving station. The receiving station calculates a good rate with measured EVM on the current channel condition and transmits a rate feedback to the transmitting station. The distinction of the present invention is that the $EVM_{SIG}$ and the $EVM_{DATA}$ are measured in the receiver for the SIGNAL fields and DATA fields, respectively. $EVM_{SIG}$ is a good indicator for one spatial stream and $EVM_{DATA}$ is a good indicator for current multiple streams. The receiver determines the optimum number of spatial data streams for feedback to the transmitter based on the combinations of $EVM_{SIG}$ and $EVM_{DATA}$ with or without other algorithms such as analysis on periodically requested sounding packet. The receiver also determines the optimum modulation and coding schemes for feedback based on the EVM measurements.

BRIEF DESCRIPTION OF THE SEVERAL VIEWS OF THE DRAWINGS

All the objects, advantages, and novel features of the invention will become more apparent from the following detailed descriptions when taken in conjunction with the accompanying drawings.

DETAILED DESCRIPTION OF THE INVENTION

Although the invention has been explained in relation to several preferred embodiments, the accompanying drawings and the following detailed descriptions are the preferred embodiment of the present invention. It is to be understood that the following disclosed descriptions will be examples of present invention, and will not limit the present invention into the drawings and the special embodiment.

Figure 1:
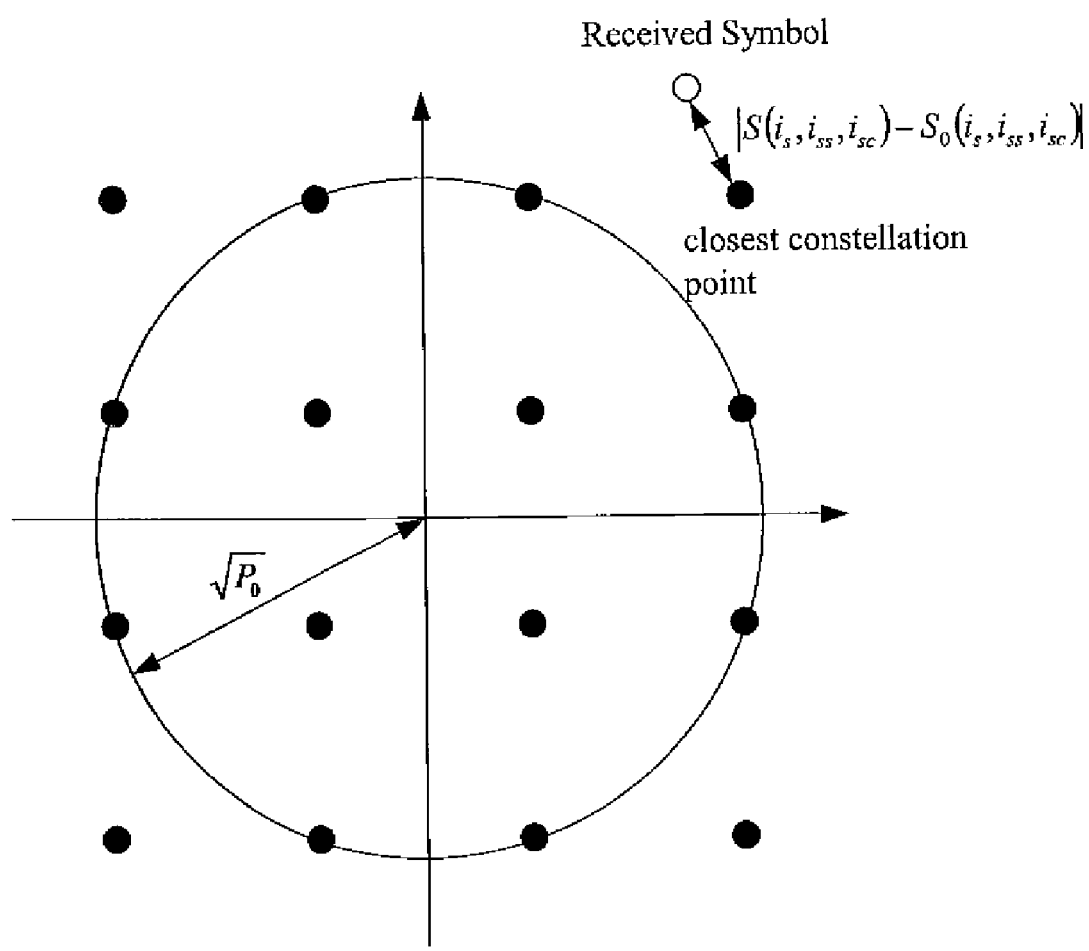
FIG. 1 is a typical figure that shows the constellations of 16 quadrature amplitude modulation (QAM) with measured received symbol, closest constellation point and the EVM example.

To understand the present invention, the definition of the EVM is described first. Referring to FIG. 1, it shows an typical example of 16 QAM constellations with a sample of the measured symbol and the closest constellation point [1]. EVM can be measured for any digital communication system, i.e., wired or wireless, single-carrier or multi-carrier, single-input single-output (SISO) or MIMO systems. As an example, we consider IEEE 802.11n system [1] that uses wireless MIMO orthogonal frequency-division multiplexing (OFDM). For such a system, EVM for each stream can be calculated as following:

$$EVM_{i_{ss}} = \sqrt{\frac{\sum_{i_s=1}^{N_{SYM}} \sum_{i_{sc}=1}^{N_{SC}} |S(i_s, i_{ss}, i_{sc}) - S_0(i_s, i_{ss}, i_{sc})|^2}{N_{SYM} \times N_{SC} \times P_0}}$$

for $i_{ss} = 1, 2, \ldots, N_{SS}$, where $S(i_s, i_{ss}, i_{sc})$ is the measured symbol for $i_s$-th OFDM symbol, $i_{ss}$ th spatial stream, $i_{sc}$ th sub-carrier and $S_0(i_s, i_{ss}, i_{sc})$ is the closest constellation point to $S(i_s, i_{ss}, i_{sc})$. Numbers, $N_{SYM}$, $N_{SS}$ and $N_{SC}$ represent the number of OFDM symbols, the number of spatial data streams and the number of sub-carriers, respectively. $P_0$ represents the average power of the constellations. Note that the EVM can be easily and instantly calculated with small hardware. Whereas, accurate and instant SNR (or SINR) is hard to calculate. By implementing this small hardware in the Rx, received signal quality is easily measured. These measured signal qualities may be used for various applications. Two applications, PLT and signal quality indicator for rate feedback selection are elaborated below.

1. EVM as a Performance Indicator

Figure 5:
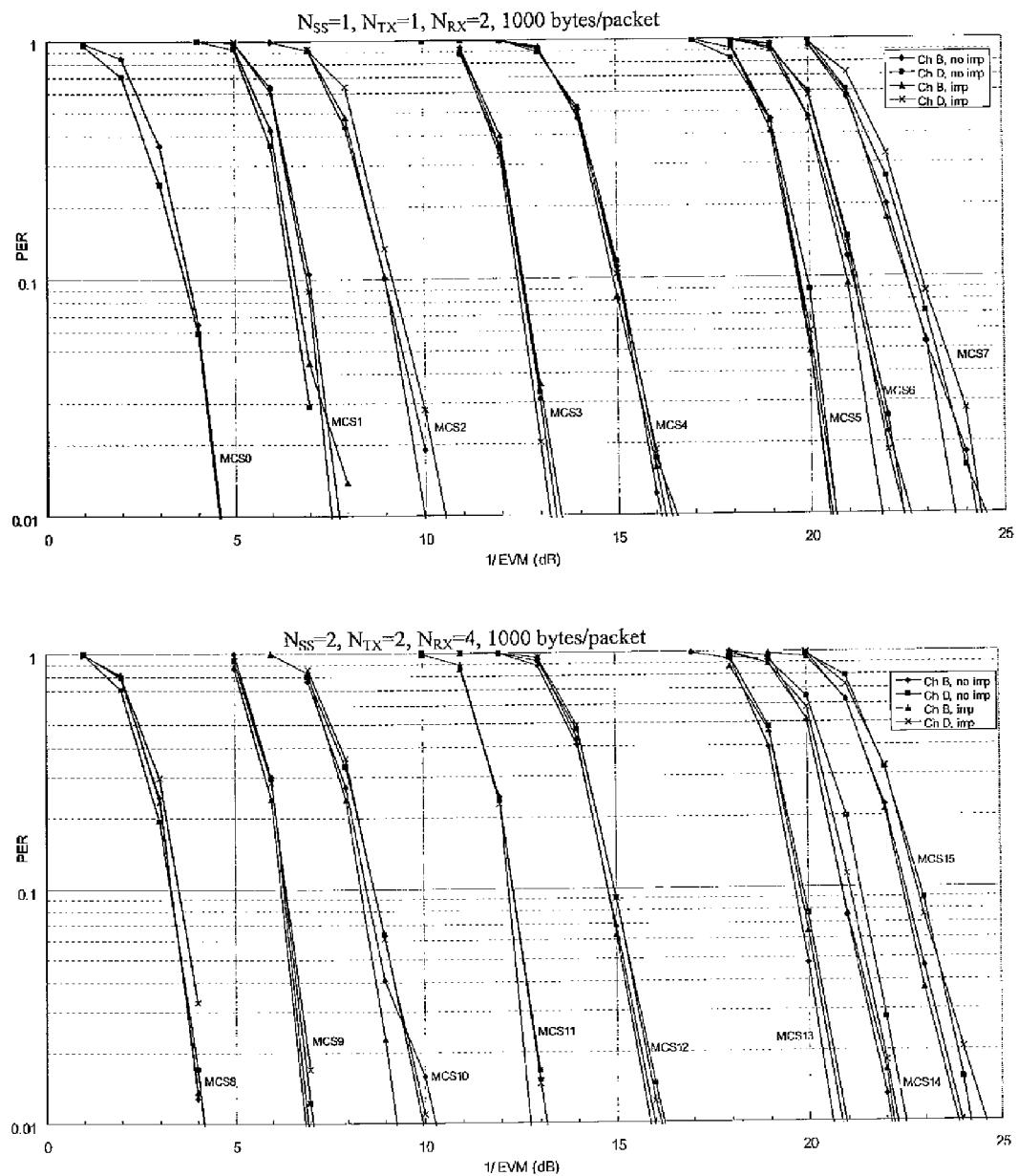
FIG. 5 is a figure that shows curves for the measured EVM vs. packet error rates for various environments and MCS.

Measured EVM in the receiver may be used as an indicator for the performance that includes channel condition and distortions caused by Tx and Rx. This measured EVM is closely related to the actual performance. Referring to FIG. 5, it shows the relation between the measured EVM for DATA field and the packet error rate (PER) as an example. PER curves are steep and consistent with the same MCS for various environments, for example IEEE 802.11n channel B and channel D [2] with/without RF impairment. In other words, the more accurate performance prediction on current Tx, Rx and channel condition is expected with measured EVMs.

Based on the curves in FIG. 5, required DATA field EVM for 10% PER are in TABLE 1. Note that this table may vary on different systems.

TABLE 1

| Modulation | Coding Rate | Rate each stream (Mbps) | Required EVM for 10% PER |
| --- | --- | --- | --- |
| BPSK | 1/2 | 6.5 | −3 dB |
| QPSK | 1/2 | 13 | −7 dB |
| QPSK | 3/4 | 19.5 | −9 dB |
| 16QAM | 1/2 | 26 | −13 dB |
| 16QAM | 3/4 | 39 | −15 dB |
| 64QAM | 2/3 | 52 | −20 dB |
| 64QAM | 3/4 | 58.5 | −21 dB |
| 64QAM | 5/6 | 65 | −23 dB |

Figure 2:
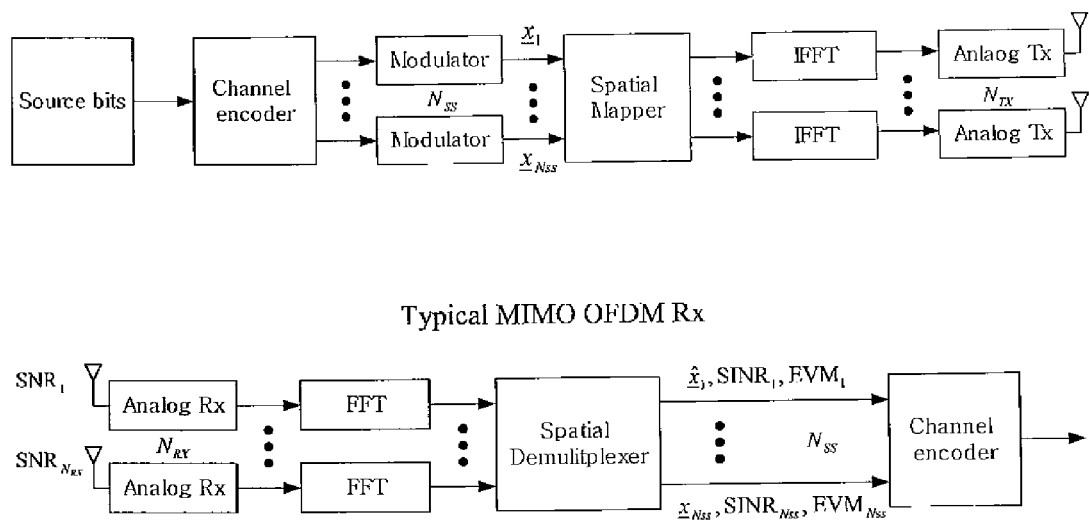
FIG. 2 is a conventional block diagram illustrating a transmitter and a receiver for wireless MIMO OFDM systems.

Referring to FIG. 2, it shows the typical structure of MIMO OFDM transmitters [1]. Source bits are encoded by channel encoder such as convolutional codes and LDPC (Low density parity codes). Interleaver may be also considered as a part of the channel encoder. Then, the encoded data are modulated, producing $N_{SS}$ parallel modulated symbol sequences, $x_i$, where $i=1, \ldots, N_{SS}$. The $N_{SS}$ symbol sequences may be further processed by a spatial mapper, producing $N_{TX}$ parallel transmit sequences where $N_{TX}$ is larger than or equal to $N_{SS}$. IEEE 802.11n [1] proposed direct mapping, spatial expansion, space time block coding, and beam forming as spatial mappers. Finally, $N_{TX}$ sequences are converted to $N_{TX}$ timedomain sequences and transmitted through $N_{TX}$ antennas using mixed-signal devices and Radio Frequency (RF) devices.

Since the multiple streams are combined in the air channel, the receiver will need to separate them to correctly demodulate these streams using various techniques. Thus, spatial de-multiplexing and channel decoding are usually separated as shown in FIG. 2. The purpose of the spatial de-multiplexing is to recover the modulated sequences $x_i$. With these estimated sequences $\hat{x}_i$, channel decoder produces decoded source bits. Linear mean-squared error estimation is one of the popular spatial de-multiplexing methods. Zero-forcing equalizer and decision-feedback equalizer are also possible to be used for estimating $\hat{x}_i$.

EVM and received SNR are closely related. Consider a single-carrier SISO system with assumption that closest constellation points are the same as the transmitted symbols, i.e., no hard-decisional error. Also, assume no Tx and Rx distortion, i.e., perfect Tx and Rx. Then, $$1/EVM = SNR.$$

In reality, EVM measurements include not only Tx/Rx distortion but also hard-decisional errors due to the mismatching between closest constellation points and the transmitted points. That means, 1/EVM is not exactly the same as the SNR, but EVM is still reliable indicator for the performance as shown in FIG. 5. Note that if a packet is correctly decoded, 1/EVM is quite close to SNR because the hard-decisional error rate is negligible. However, the EVM may be possibly underestimated when the packet error happens.

Consider the IEEE802.11n MIMO OFDM system [1]. Due to MIMO configurations, multiple streams are combined in the air channel as shown in FIG. 2. The receiver needs de-multiplexer to separate spatial streams for decoding. After spatial de-multiplexing, it is reasonable to consider not only noise, but also interference from the other streams. Therefore, SINR is more meaningful for signal quality of MIMO systems. This SINR for each stream also contributes to EVM for the corresponding stream. That is, both SINR and EVM for each stream are good indicators for signal quality of each stream, and in this case they are closely correlated.

Figure 6:
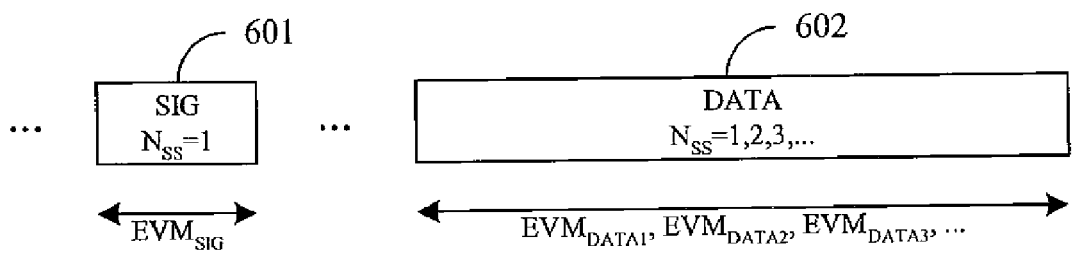
FIG. 6 is a block diagram illustrating the packet format of IEEE 802.11n systems.

In most communication systems, a packet usually consists of a preamble and payload. The preamble usually includes a fixed-pattern synchronization sequence and a header conveying packet length and modulation type information of the payload. In IEEE 802.11n systems [1], the preamble includes SIGNAL fields (block 601) while the payload is called DATA field (block 602) as shown FIG. 6. This SIGNAL fields are encoded with fixed rate and include parameters such as $N_{SS}$, MCS and packet length. EVMs for SIGNAL fields and DATA field may be measured separately. $EVM_{SIG}$ and $EVM_{DATA}$ are defined and used for the EVM measurements of SIGNAL and DATA fields, respectively. Since the receiver can not know how many streams the transmitter are transmitting until the decoding of SIGNAL field, the SIGNAL field is demodulated and decoded as a single stream. Therefore, $EVM_{SIG}$ reflects the summation of SNR for all the Rx antennas and $EVM_{DATAi}$ is related to $SINR_i$. Here $EVM_{DATAi}$ and $SINR_i$ are EVM and SINR for i-th stream, respectively.

Assuming frequency-flat channel, no hard-decisional error and perfect Tx and Rx, the following relations hold.

$$1/EVM_{SIG} = \sum_{n=1}^{N_{RX}} SNR_n$$

$$1/EVM_{DATAi} = SINR_i$$

$EVM_{SIG}$ is a good indicator that shows the signal quality if only one stream is transmitted and $EVM_{DATA}$ is a good indicator if multiple streams are transmitted. Also, by comparing these EVMs, we can determine whether the current channel supports multiple streams or not. There is a following relation between SNR and SINR:

$$\sum_{n=1}^{N_{RX}} SNR_n \geq \sum_{i=1}^{N_{SS}} SINR_i,$$

where equality holds for orthogonal channels. Thus, $$EVM_{ratio} \equiv EVM_{SIG} \bigg/ \sum_{i=1}^{N_{SS}} EVM_{DATAi}$$

is a good indicator that shows orthogonality of the channel or severity of the interference. "$EVM_{ratio}=1$" may be interpreted as no interference between spatial streams and small $EVM_{ratio}$ as large interference. Note that this $EVM_{ratio}$ is still useful for frequency-selective channel with hard-decisional errors.

2. Production Line Testing

Table 2 shows an example as an embodiment of MCS set and its data rates for IEEE 802.11n [1]. Each stream may have different MCS for the maximum data rate. For the purpose of the Tx testing, maximum allowable transmit signal errors are defined for different rates. For example, rate 39 Mbps (16 QAM with ¾ coding rate) requires smaller than or equal to −19 dB EVM. Transmit modulation accuracy should be measured by high-precision devices. Otherwise, significant distortion may be added to the transmit signals.

TABLE 2

| MCS | | Modulation | Coding Rate | Rate each stream (Mbps) | Transmit Accuracy Test Requirement |
|---|---|---|---|---|---|
| Nss = 1 | Nss = 2 | | | | |
| 0 | 8 | BPSK | ½ | 6.5 | −5 dB |
| 1 | 9 | QPSK | ½ | 13 | −10 dB |
| 2 | 10 | QPSK | ¾ | 19.5 | −13 dB |
| 3 | 11 | 16QAM | ½ | 26 | −16 dB |
| 4 | 12 | 16QAM | ¾ | 39 | −19 dB |
| 5 | 13 | 64QAM | ⅔ | 52 | −22 dB |
| 6 | 14 | 64QAM | ¾ | 58.5 | −25 dB |
| 7 | 15 | 64QAM | ⅚ | 65 | −28 dB |

GI = 800 ns, 20 MHz BW [1]

Figure 3:
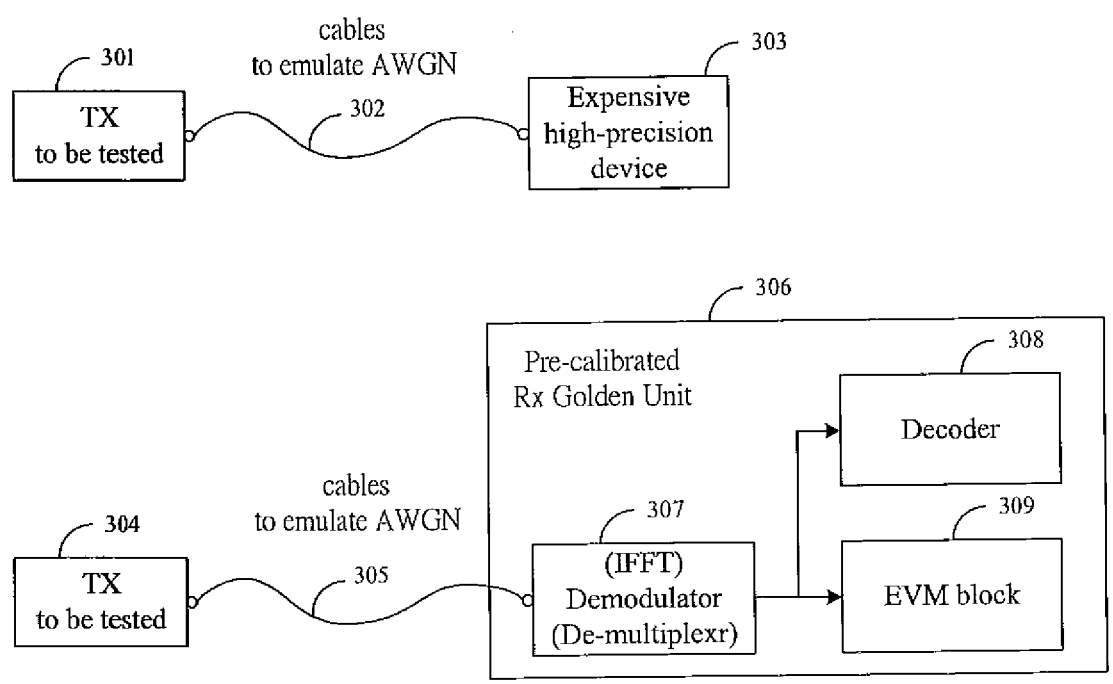
FIG. 3 is a block diagram illustrating transmitter accuracy tests with expensive high-precision device and pre-calibrated Rx golden unit that includes EVM measurement block.
Figure 4:
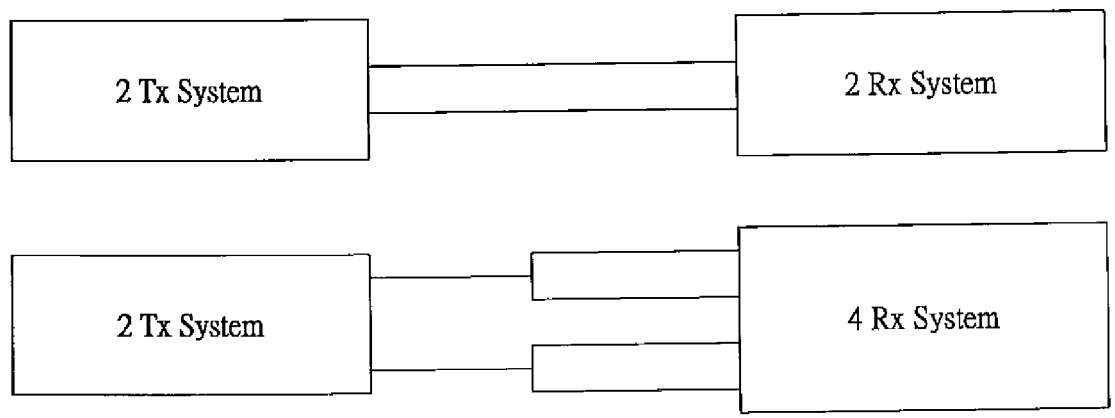
FIG. 4 is showing the cable connection examples for FIG. 3 block 302.

FIG. 3 illustrates these transmit accuracy test. A transmitter (block 301) to be tested is connected to the testing equipment (block 303) via a set of cables (block 302). Note that depending on the number of Tx and Rx antennas, there are different combination of cables and splitters as FIG. 4 gives two examples. The cables shall emulate an AWGN channel.

Expensive high-precision devices that can demodulate signals with sufficient accuracy may be used for these transmit modulation accuracy test (block 303). However, large set of these expensive devices may be required for fast production line testing. Instead of expensive high-precision devices, EVM blocks included in the Rx may be used for these tests. Even though every Rx may contain an EVM measurement block (block 309), each Rx in mass-production might have various impairment. While doing the transmitter test, the Rx impairments in a Rx golden unit may therefore contribute to the measured EVM. Rx golden units (block 306) that demodulate with sufficient precision may be pre-selected to guarantee sufficient accuracy, or the EVM contributed by the Rx impairment of a golden unit can be measured and deducted from the total EVM to better estimate the EVM of the transmitter device under test.

It is noted that by replacing expensive high-precision devices with pre-calibrated Rx golden units in transmit accuracy tests in the present invention, the expense for testing can be greatly reduced. Furthermore, the lower-cost Rx golden unit can save time since testing multiple transmitters simultaneously will be more affordable.

These EVM blocks may be also used for receiver performance tests by connecting (via a cable) the receiver under test to a pre-calibrated Tx golden unit with sufficient accuracy. Now referring to FIG. 4, in case the number of $N_{Rx}$ is greater than $N_{Tx}$, splitters can be used to split transmit signals for multiple receivers. EVM measurements are more cost-effective than packet error rate (PER) measurements. This is because EVM measurements can be performed within one or two packets, whereas PER measurements require many more packet to become statistically meaningful. That is, receiver performance may be determined according to the measured EVM values.

3. Rate Adaptation for MIMO Systems

As mentioned earlier, rate adaptation is a mechanism to access optimum data rate supported on the current channel condition to achieve the maximum data throughput. A receiving station may help the transmitting station select the optimum transmit data rate by sending the recommended rate feedback.

Figure 7:
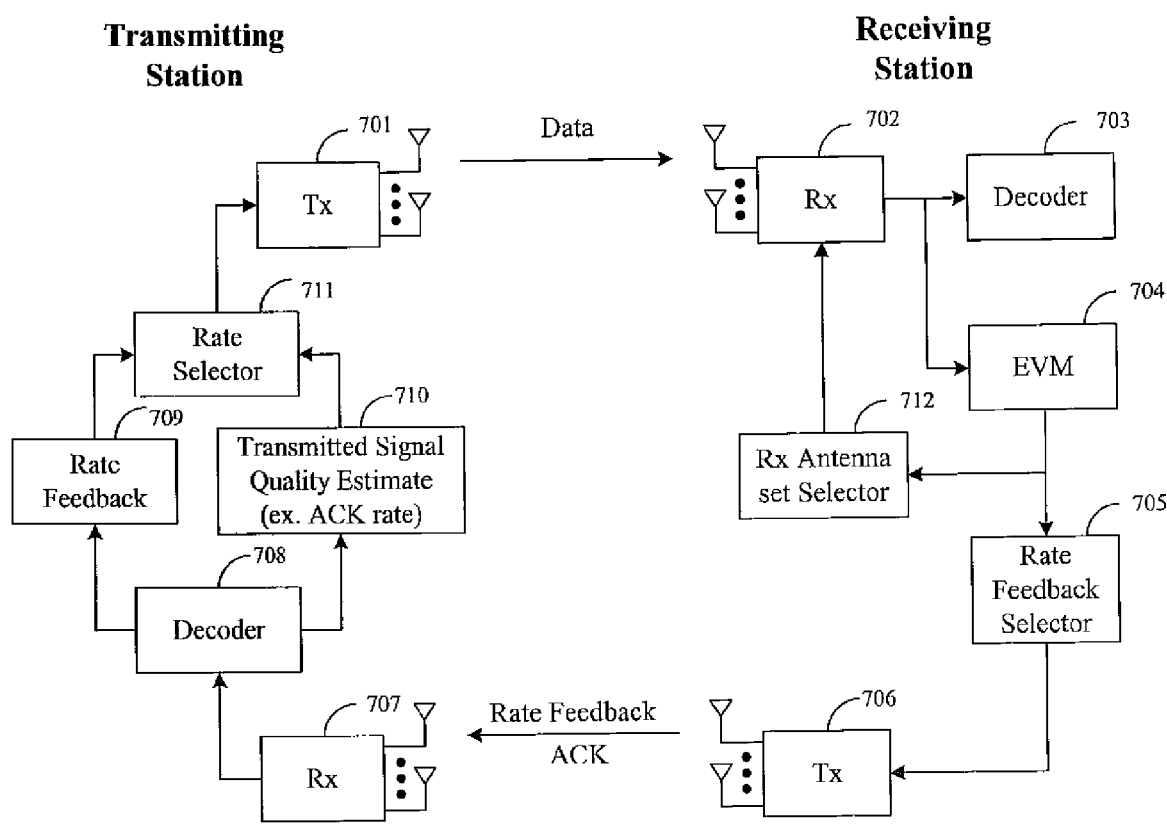
FIG. 7 is a block diagram of the present invention illustrating a transmitting station and receiving station for rate adaptation mechanism.

Referring to FIG. 7, it is a functional block diagram illustrating the rate adaptation processing with rate feedback according to the present invention. A transmitting station transmits data streams to a receiving station. The receiving station calculates the preferred rate for the future and sends the preferred rate as a rate feedback. The transmitting station selects the transmit rate based on not only the feedback from the receiving station but also signal quality measured in the transmitting station, such as the rate of the correct ACK (acknowledgement) from the receiving station. Note that Tx and Rx antennas in each station may be shared by using antenna switch.

To be more specific, a transmitter (block 701) in the transmitting station (Station 1) shall transmit data to the receiving station (Station 2). The receiving station (Station 2) mainly comprises a receiver (block 702), a decoder (block 703), an EVM measurement block (block 704), a rate feedback selector (block 705), a transmitter (block 706) in the receiving station (Station 2) and a Rx antenna set selector (block 712). The transmitting station (Station 1) mainly comprises a receiver (block 707) in the transmitting station (Station 1), a decoder (block 708), a rate feedback unit (block 709), a signal quality estimation block (block 710), a rate selector (block 711) and a transmitter (block 701).

The receiver (block 702) in the receiving station (station 2) shall demodulate and spatially de-multiplex to recover the transmitted symbols and the decoder (block 703), electrically connected to the receiver (block 702) in the receiving station, shall decode the received symbols. The EVM measurement block (block 704), electrically connected to the receiver (block 702) in the receiving station, shall measure average EVM as a signal quality indicator of the received symbols. The rate feedback selector (block 705), electrically connected to the EVM measurement block (block 704), shall select the Nss and their rates as the rate feedback. The transmitter (block 706) in the receiving station, electrically connected to the rate feedback selector (block 705), shall transmit the rate feedback and reply ACK packet to the transmitting station. In addition, the Rx antenna set selector (block 712) is electrically connected to the EVM measurement block (block 704).

The receiver (block 707) in the transmitting station (Station 1) shall demodulate and spatially de-multiplex to recover the symbols from the receiving station. The decoder (block 708), electrically connected to the receiver (block 707) in the transmitting station, shall decode the symbols to send the decoded symbols to the rate feedback unit (block 709). The signal quality estimation block (block 710), electrically connected to the decoder (block 708), shall estimate the long-term link quality as supplementary indicators. For example, ACK rate may be one of the good signal quality indicators that can be measured in the quality estimation block (block 710). The rate feedback unit (block 709), electrically connected to the decoder (block 708), shall recover the rate feedback and send the information to the rate selector (block 711). With these combined information, the rate selector (block 711), electrically connected to the rate feedback unit (block 709) and the quality estimation block (block 710), shall make the final determination of the rate to be transmitted to the receiving station.

For the purpose of power saving, only partial set of Tx/Rx antennas may be turned on. Several operation modes such as (1) maximum throughput mode, (2) normal mode and (3) power saving mode can be defined for this purpose. In maximum throughput mode, all the antennas may be turned on to achieve maximum throughput. In power saving mode, only minimum set of antennas required for the current rate may be turned on to minimize the power consumption. In normal mode, power consumption and the throughput may be compromised.

If only partial set of Rx antennas is turned on, it is needed to select a good set of Rx antennas for the good performance. The Rx antenna set selection (block 712) may be done with measured EVMs for each set of Rx antennas and/or measured received power. For single spatial data stream, received powers may be a good indicator for this Rx set selection. However, received powers may not be sufficient for multiple spatial data streams, because interferences from the other streams may be also important for decoding. Therefore, measure EVMs for each set of Rx antennas may be helpful to select a good Rx set.

Figure 8:
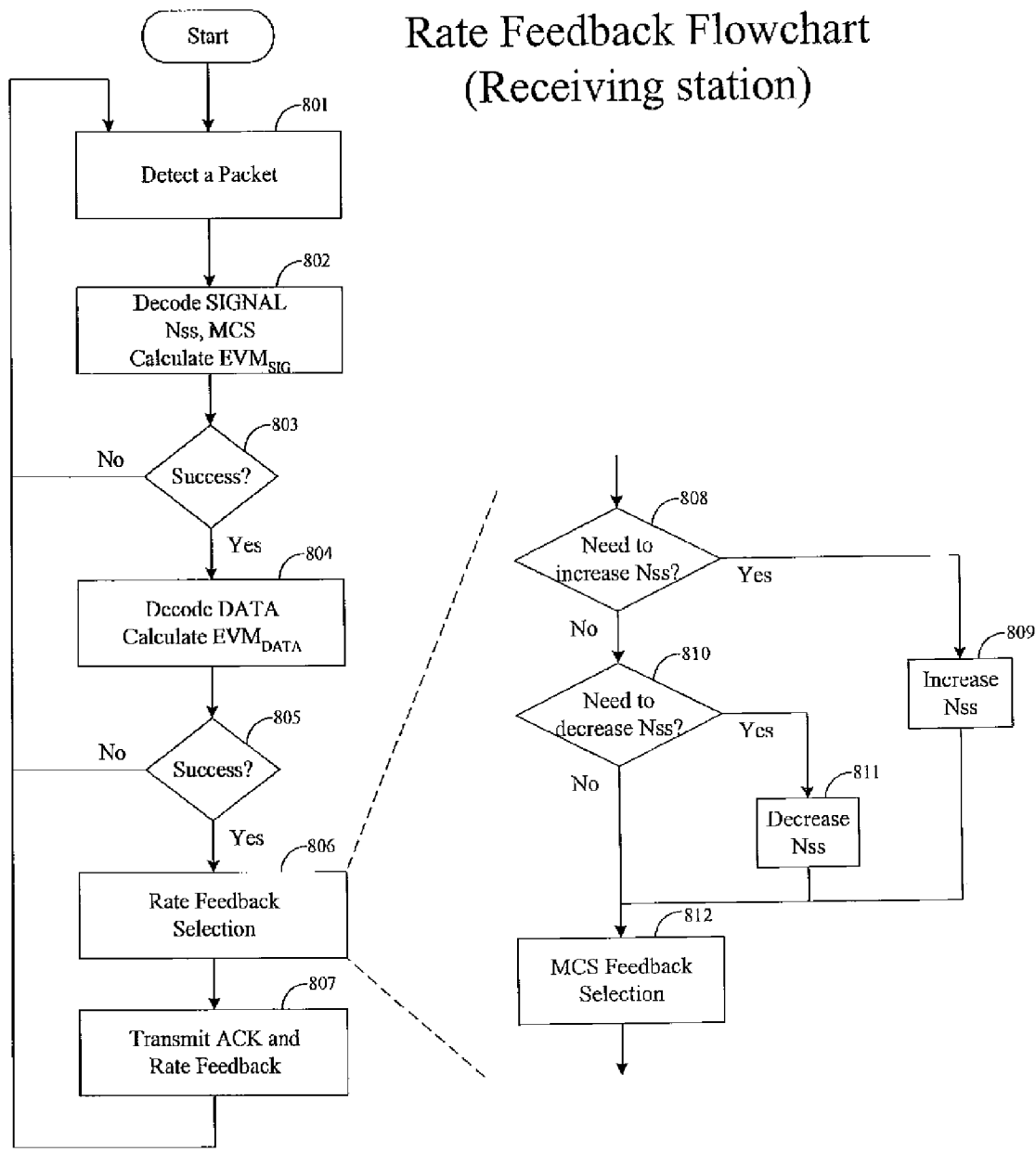
FIG. 8 is a flow chart of the present invention illustrating the rate feedback algorithm in the receiving station.

Referring to FIG. 8, it is a rate feedback flow chart in the receiving station according to the present invention. After detecting a packet (block 801), the receiving station decodes SIGNAL fields (block 802) to achieve the measurement of averaged $EVM_{SIG}$, which is processed in an EVM measurement unit for SIGNAL field in the EVM measurement block (block 704 in FIG. 7). From these decoded SIGNAL fields, the receiving station shall be noticed the transmit parameters for the Nss and the MCS. The receiving station shall also measure the average EVM of the signal fields that have only one spatial data stream.

After successful decoding of the SIGNAL fields, the DATA field shall be decoded with measurement of averaged $EVM_{DATA}$ (block 804), which is processed in an EVM measurement unit for DATA field in the EVM measurement block (block 704 in FIG. 7), electrically connected to the EVM measurement unit for SIGNAL field. The rate for the feedback to the transmitting station shall be determined by analyzing the two averaged EVMs: $EVM_{SIG}$ and $EVM_{DATA}$ (block 806), which is processed in the rate feedback selector (block 705 in FIG. 7). This rate feedback shall be transmitted to the transmitting station (block 807).

Blocks 808-812 shows the details of one implementation for the rate feedback selection block 806. In the block 808, it is determined whether more data streams than the received Nss shall be feed-backed or not. If more streams are determined to be feed-backed, the Nss shall be increased (block 809). If not, it will be determined whether the received Nss is supported or not (block 810). The Nss shall be decreased (block 811) based on the determination of block 810. After selecting the Nss, MCS shall be determined (block 812).

Nss Increase Algorithms (Block 808)

It is hard to decide whether the current channel supports more than received Nss or not because no channel information beyond the received Nss is available in the Rx. Several ways for Nss increase may be considered. The following algorithms for Nss increase may be applied together or separately.

Increased Nss may be feed-backed periodically and/or when required. By doing feedback more than current Nss streams, the receiver shall receive the packet that has more than current Nss streams in the future. Then, the receiver can determine whether this increased number of streams is good or not by checking $EVM_{ratio}$ and/or the maximum possible rates on different numbers of spatial streams.

Another way is to request the transmitting station a sounding packet that has all the channel information. IEEE 802.11n [1] defines optional extension HT-LTFs to sound extra spatial dimensions of MIMO channel. For example, even though the data field has one stream, the channel information on multiple streams may be acquired with optional extension HT-LTFs. By analyzing this sounding packet, the optimum Nss on the current channel may be determined.

Interference level of more than Nss streams may be anticipated by measuring interference level of current Nss streams. That is, if the interference level of current Nss streams is smaller than pre-calculated thresholds, increased Nss may be feed-backed. From blocks 801-807, both $EVM_{SIG}$ and $EVM_{DATA}$ are available. $EVM_{ratio}$ is also easily calculated from $EVM_{SIG}$ and $EVM_{DATA}$. As mentioned earlier, $EVM_{ratio}$ is a good indicator that shows the interference level. This $EVM_{ratio}$ may be compared to the pre-calculated thresholds to determine whether current Nss is supported or not on the current channel condition. These thresholds may be different for different Nss and different MCS.

IF $EVM_{ratio} >$ THRESHOLD_INC$_{Nss, MCS}$

Increase Nss

Note that $EVM_{ratio}$ is available only for Nss>1.

Nss Decrease Algorithms (Block 810)

Decreased Nss may be feed-backed periodically and/or when required. By doing feedback smaller than current Nss, the receiver shall receive the packet that has less than current Nss streams in the future. Then, the receiver can determine whether this decreased number of streams is good or not by checking $EVM_{ratio}$ and/or the maximum possible rates on different numbers of spatial streams.

$EVM_{ratio}$ may be compared to the pre-calculated thresholds to determine whether current Nss is supported or not on the current channel condition. These thresholds may be different for different Nss and different MCS.

IF $EVM_{ratio} <$ THRESHOLD_DEC$_{Nss, MCS}$

Decrease Nss

If the current Nss is two, the max possible rates for Nss=1 and 2 shalt be calculated from the $EVM_{SIG}$, $EVM_{DATA}$ and pre-calculated table such as TABLE 1. From these maximum possible rates, the Nss for a feedback shall be determined. More details will be given later.

MCS Selection Algorithm (Block 812)

If the Nss feedback is determined to have the same value as the current Nss, MCS for each stream may be determined from TABLE 1 with $EVM_{DATA}$. To determine the MCS is merely to find the highest rate of which current $EVM_{DATA}$ can support. Averaged $EVM_{DATA}$ over data streams may be used to select one rate for all the data streams in case every data stream needs to have the same rate.

Since $EVM_{DATA}$ depends on Nss, if the Nss feedback is determined to increase or decrease, the $EVM_{DATA}$ of current Nss is not a direct indicator for the optimum rate any more. If one stream is requested as a feedback, the optimum MCS may be determined from TABLE 1 with $EVM_{SIG}$. Otherwise, both $EVM_{DATA}$ and $EVM_{SIG}$ are not direct indicators for the optimum rate. In this case, MCS for each stream may be determined with pre-determined values or calculated from the current MCS and/or $EVM_{DATA}$.

4. Rate feedback for MIMO Systems with 2 Tx and 4 Rx

Figure 12:
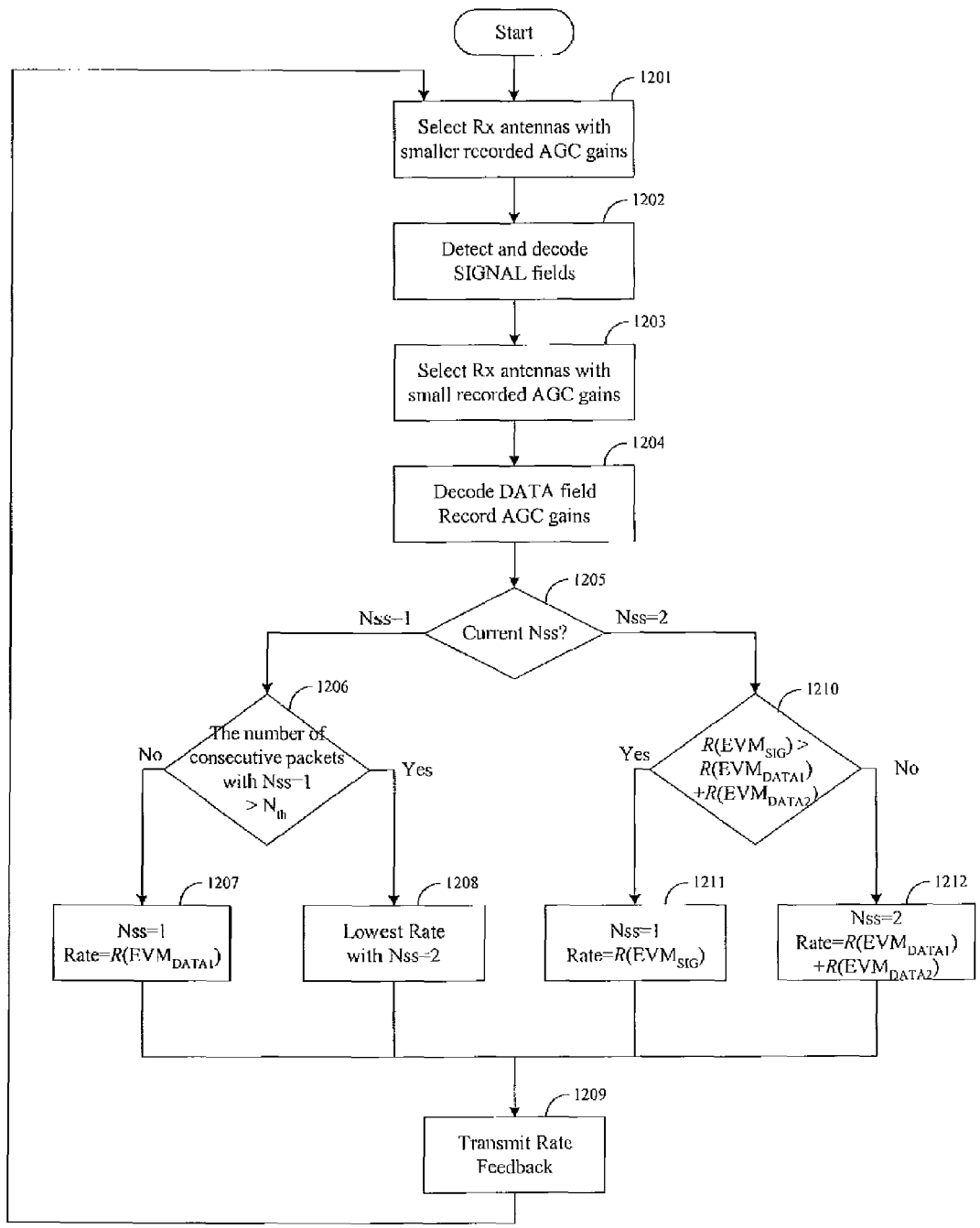
FIG. 12 is a flow chart of an embodiment of the present invention illustrating the rate feedback algorithm for wireless system with two transmit and four receive antennas.

In this section, we focus on an embodiment of IEEE 802.11n system with 2 Tx and 4 Rx antennas. FIG. 12 is a flow chart for the receiving station of MIMO systems with 2 Tx and 4 Rx antennas. The supported Nss is up to 2 because Nss can not exceed the number of Tx antennas. For power-saving purpose, some antennas and RF blocks may be turned off. For example, three operation modes are defined for different power consumptions: max throughput mode, normal mode and power saving mode. Note that the following descriptions are applicable not only to 2 Tx, 4 Rx systems but also to other systems such as 2 Tx, 3 Rx systems. We assume 2 Tx and 4 Rx systems for simpler explanations.

Figure 9:
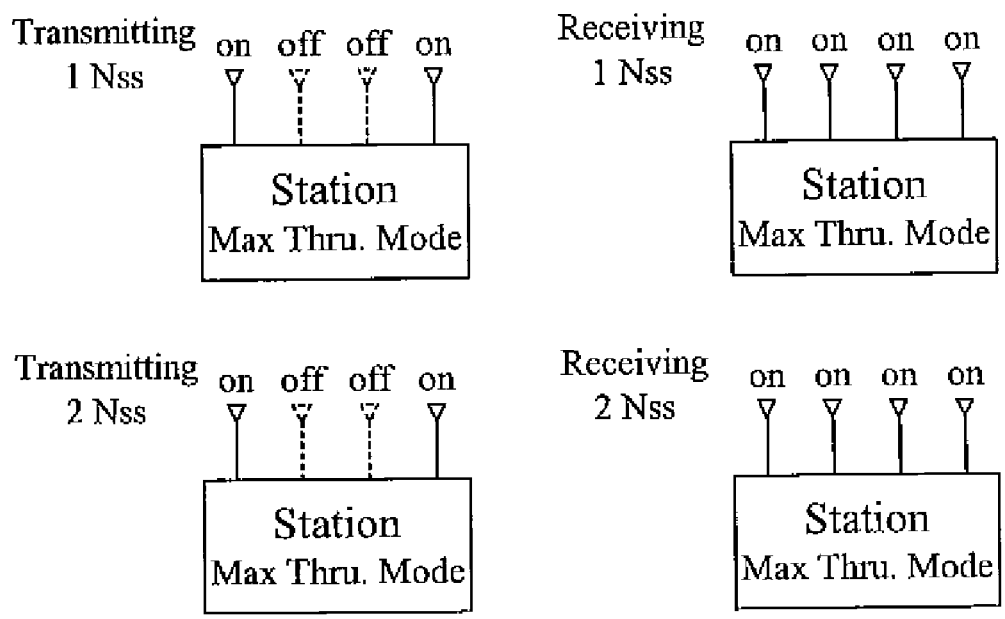
FIG. 9 is a block diagram of the present invention illustrating the maximum throughput mode for wireless system with two transmit and four receive antennas.

Referring to FIG. 9, it shows the embodiment of IEEE 802.11n system with maximum throughput mode. All the Tx and RX antennas are turned on. One stream may be mapped to 2 Tx antennas with spatial mapping techniques such as cyclic delay diversity (CDD) as explained in [1]. This mode is recommended for AP because the power consumption usually is not a concern for AP. However, the power consumption may be important for terminal stations, which are usually portable devices.

Figure 10:
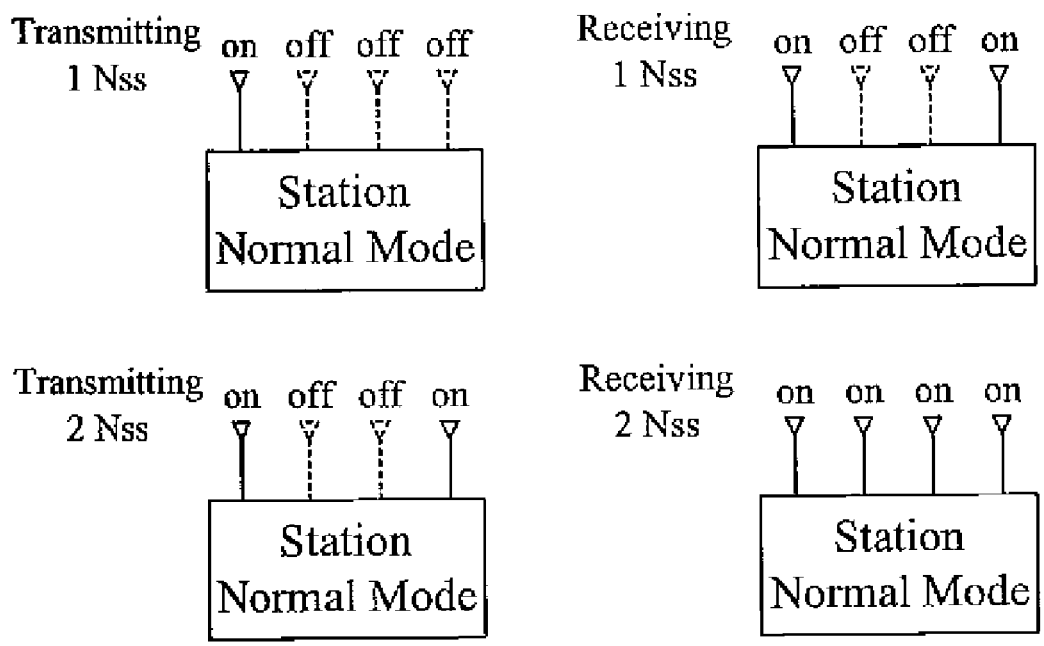
FIG. 10 is a block diagram of the present invention illustrating the normal mode for wireless system with two transmit and four receive antennas.
Figure 11:
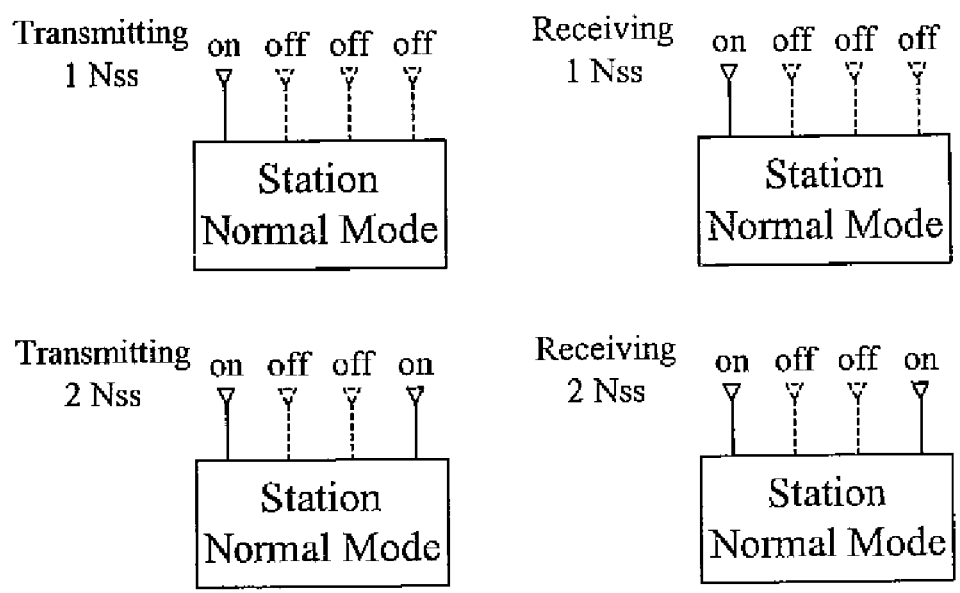
FIG. 11 is a block diagram of the present invention illustrating the power saving mode for wireless system with two transmit and four receive antennas.

Referring to FIG. 10, it shows the embodiment of IEEE 802.11n system with normal mode. For Nss=1, only one Tx and two Rx antennas are turned on for power saving. All the Tx and Rx antennas are turned on for Nss=2. Furthermore, for power-saving mode, shown in FIG. 11, only minimally required antennas are turned on. That is, one Tx, one Rx antennas for Nss=1 and two Tx, two RX antennas for Nss=2. These two modes are recommended especially for terminal stations where power consumption matters more than throughput and range.

For normal mode and power-saving mode, sometimes only partial set of Rx antennas is turned on. To maximize the performance with a given number of Rx antennas, it is recommended to select good set of RX antennas. One simple way to select a partial set of Rx antennas is to select Rx antennas with smaller AGC gains. A smaller AGC gain means the received signal power is greater. This selection based on AGC gains works well for Nss=1 because the total signal power is a good indicator for the performance. However, AGC gains are not sufficient to select the active set of Rx antennas for Nss=2 because the channel orthogonality or interference level from the other stream is also an important factor determining whether current channel supports two streams. That is, if the orthogonality is poor or too much interference from the other stream exists, two streams may not be supported no matter how large the received signal power is.

For Rx selections for multiple streams (e.g. Rx power saving mode with Nss=2), every Rx set needs to be tested to determine best set for the performance. For example, averaged $EVM_{data}$ of every Rx set may be calculated and compared to determine the set with the best averaged $EVM_{data}$.

Referring to FIG. 12, it is a flow chart for the receiving station of MIMO systems with 2 Tx and 4 Rx antennas, where all the Rx antennas are not always turned on. And the Rx antenna selection is done by AGC gains (block 1201). Because the SIGNAL field is transmitted with only one stream, all the Rx antennas does not need to be turned on in the beginning. For normal mode, up to two Rx antennas is adequately enough for SIGNAL field decoding. During decoding SIGNAL field (block 1202), $EVM_{SIG}$ shall be measured. More Rx antennas may need to be turned on based on the Nss of DATA field (block 1203). When the DATA field is being decoded, the AGC gains shall be recorded for the Rx selection for the next packet (block 1204). $EVM_{DATA1}$ shall be measured during decoding DATA field. $EVM_{DATA2}$ shall be also measured when Nss=2.

Consider Nss=2 for the DATA field. Rates, supported on the current channel condition, can be directly derived from TABLE 1 that is predetermined by simulation or field test. A function, R(x) is defined as follows:

$$R(x) = \text{max. rate that } EVM \text{ of } x \text{ can support}$$

The maximum rate for Nss=1 is $R(EVM_{SIG})$ and the maximum rate for Nss=2 is $R(EVM_{DATA1})+R(EVM_{DATA2})$. By comparing these two rates, the Nss shall be selected (block 1210).

IF $R(EVM_{SIG}) > R(EVM_{DATA1})+R(EVM_{DATA2})$
   select Nss=1 and the rate $R(EVM_{SIG})$ (block 1211)
ELSE
   select Nss=2 and the rates, $R(EVM_{DATA1})$ and $R(EVM_{DATA2})$ (block 1212)

Note that it is optional that rates for the multiple streams are different in IEEE 802.11n [1]. If the same rates are required for the multiple streams, average EVM values over multiple EVMs may be used. That is, $EVM_{DATA}=(EVM_{DATA1}+EVM_{DATA2})/2$. The recommended rate for Nss=2 will be 2×R($EVM_{DATA}$).

IF $R(EVM_{SIG}) > 2 \times R(EVM_{DATA})$
   select Nss=1 and the rate $R(EVM_{SIG})$ (block 1211)
ELSE
   select Nss=1 and the rates, $R(EVM_{DATA})$ (block 1212)

If the decoded Nss for the DATA field is just one, it is not sufficient to extrapolate the channel conditions for two spatial streams. There are several ways to examine these channel conditions. If required, receiving station may ask the transmitting station to transmit extended LTS that has the whole set of channel gains. Or, if required, receiving station may ask the transmitting station to transmit two streams for examination. Block 1206 shows an example to request two streams periodically to check the channel conditions. After N-th consecutive packets with Nss=1, receiving station may request two spatial streams (block 1208). Without such a request, $R(EVM_{DATA1})$ shall be transmitted as a rate feedback (block 1207).

For simplicity, the following examples are given assuming that each spatial stream has the same rate.

Ex. 1 Received packet: Nss=2, $EVM_{SIG}=-17$ dB, $EVM_{DATA}=-13$ dB $$R(EVM_{SIG})=R(-17 \text{ dB})=39 \text{ Mbps}$$

$$2*R(EVM_{DATA})=2*R(-13 \text{ dB}))=2*26 \text{ Mbps } 52 \text{ Mbps}$$

Since $R(EVM_{SIG}) < 2 \times R(EVM_{DATA})$, 52 Mbps (Nss=2, 16 QAM, ½ coding rate) will be sent to the transmitting station as a rate feedback.

Ex. 2 Received packet: Nss=2, $EVM_{SIG}=-22$ dB, $EVM_{DATA}=-11$ dB $$R(EVM_{SIG})=R(-22 \text{ dB})=58.5 \text{ Mbps}$$

$$2*R(EVM_{DATA})=2*R(-11 \text{ dB})=2*19.5 \text{ Mbps}=39 \text{ Mbps}$$

Since $R(EVM_{SIG}) > 2 \times R(EVM_{DATA})$, 58.5 Mbps (Nss=1, 64 QAM, ¾ coding rate) will be sent to the transmitting station as a rate feedback.

Ex. 3 Received packet: Nss=2, $EVM_{SIG}=-20$ dB, $EVM_{DATA}=-13$ dB $$R(EVM_{SIG})=R(-20 \text{ dB})=52 \text{ Mbps}$$

$$2*R(EVM_{DATA})=2*R(-13 \text{ dB})=2*26 \text{ Mbps}=52 \text{ Mbps}$$

Since $R(EVM_{SIG})=2 \times R(EVM_{DATA})$, either 52 Mbps (Nss=1, 64 QAM, ⅔ coding rate) or 52 Mbps (Nss=2, 16 QAM, ½ coding rate) will be sent to the transmitting station as a rate feedback.

From the above description, the present invention provides an apparatus and method for production line testing for both transmitters and receivers with EVM measurement blocks embedded in receivers. The apparatus and method according to the present invention improves the rate adaptation in digital communication systems that support multiple rates Although the invention has been explained in relation to its preferred embodiment, it is not used to limit the invention. It is to be understood that many other possible modifications and variations can be made by those skilled in the art without departing from the spirit and scope of the invention as hereinafter claimed.

We claim:

1. An apparatus in a multiple-input multiple-output (MIMO) receiving station, comprising:
   an EVM measurement unit for SIGNAL field, used to measure a combined effect of all spatial streams to achieve the measurement of averaged $EVM_{SIG}$; and
   an EVM measurement unit for DATA field, electrically connected to the EVM measurement unit for SIGNAL field, used in each spatial stream to support unequal modulation and coding rate (MCS) for multiple streams to achieve the measurement of averaged $EVM_{DATA}$.

2. The apparatus in a multiple-input multiple-output (MIMO) receiving station as claimed in claim 1, further comprising:
   a rate feedback selector, electrically connected to the EVM measurement unit for SIGNAL field and the EVM measurement unit for DATA field, used to provide a feedback determined by analyzing the two averaged $EVM_{SIG}$ and $EVM_{DATA}$ to a transmitting station.

3. The apparatus in a multiple-input multiple-output (MIMO) receiving station as claimed in claim 1, wherein the EVM measurement unit for SIGNAL field measures the combined effect of all spatial streams in preamble.

4. The apparatus in a multiple-input multiple-output (MIMO) receiving station as claimed in claim 1, wherein the EVM measurement unit for DATA field has a payload in each spatial stream to support unequal MCS for multiple streams.

5. The apparatus in a multiple-input multiple-output (MIMO) receiving station as claimed in claim 2, wherein the rate feedback selector obtains a number of the spatial data streams ($N_{SS}$) and a data rate for MCS by utilizing the measured $EVM_{SIG}$ and $EVM_{DATA}$ and a received power.

6. The apparatus in a multiple-input multiple-output (MIMO) receiving station as claimed in claim 5, wherein the receiving station transmits a request of increasing Nss periodically when required.

7. The apparatus in a multiple-input multiple-output (MIMO) receiving station as claimed in claim 6, wherein the receiving station determines whether the request of increasing Nss received packet is good or not by checking the averaged $EVM_{SIG}$ and $EVM_{DATA}$ and/or the maximum possible rates on different numbers of spatial streams.

8. The apparatus in a multiple-input multiple-output (MIMO) receiving station as claimed in claim 6, wherein the receiving station transmit a request for a sounding packet that has all the channel information and the optimum Nss on the current channel is determined by analyzing the channel coefficients.

9. The apparatus in a multiple-input multiple-output (MIMO) receiving station as claimed in claim 5, wherein the receiving station determines the optimum Nss and MCS in terms of the balance of throughput and power saving.

10. The apparatus in a multiple-input multiple-output (MIMO) receiving station as claimed in claim 9, wherein the receiving station determines the optimum Nss and MCS in maximum throughput mode, which is for the maximum throughput by turning on all the Tx and Rx antennas in the receiving station and the transmitting station.

11. The apparatus in a multiple-input multiple-output (MIMO) receiving station as claimed in claim 9, wherein the receiving station determines the optimum Nss and MCS in normal mode, which is for compromising of the power saving and the throughput by turning on partial set of Tx and Rx antennas in the receiving station and the transmitting station.

12. The apparatus in a multiple-input multiple-output (MIMO) receiving station as claimed in claim 9, wherein the receiving station determines the optimum Nss and MCS in power saving mode, which is for the maximum power saving by turning on minimally required set of Tx and Rx antennas in the receiving station and the transmitting station for the current data rate.

13. A method of improving transmit modulation accuracy and receiver performance test in a MIMO system, comprising the steps of:
    measuring a combined effect of all spatial streams to achieve the measurement of averaged $EVM_{SIG}$ in an EVM measurement unit for SIGNAL field, and
    supporting an unequal modulation and coding rate (MCS) in each spatial stream for multiple streams to achieve the measurement of averaged $EVM_{DATA}$ in an EVM measurement unit for DATA field, electrically connected to the EVM measurement unit for SIGNAL field.

14. The method as claimed in claim 13, further comprising the step of:
    providing a feedback determined by analyzing the two averaged $EVM_{SIG}$ and $EVM_{DATA}$ in a rate feedback selector, electrically connected to the EVM measurement unit for SIGNAL field and the EVM measurement unit for DATA field, to a transmitting station.

15. The method as claimed in claim 13, wherein the EVM measurement unit for SIGNAL field measures the combined effect of all spatial streams in preamble.

16. The method as claimed in claim 13, wherein the EVM measurement unit for DATA field has a payload in each spatial stream to support unequal MCS for multiple streams.

17. The method as claimed in claim 14, wherein the rate feedback selector obtains a number of the spatial data streams ($N_{SS}$) and a data rate for MCS by utilizing the measured $EVM_{SIG}$ and $EVM_{DATA}$ and a received power.

18. The method as claimed in claim 17, wherein the receiving station transmits a request of increasing Nss periodically when required.

19. The method as claimed in claim 18, wherein the receiving station determines whether the request of increasing Nss received packet is good or not by checking the averaged $EVM_{SIG}$ and $EVM_{DATA}$ and/or the maximum possible rates on different numbers of spatial streams.

20. The method as claimed in claim 18, wherein the receiving station transmit a request for a sounding packet that has all the channel information and the optimum Nss on the current channel is determined by analyzing the channel coefficients.

21. The method as claimed in claim 17, wherein the receiving station determines the optimum Nss and MCS in terms of the balance of throughput and power saving.

22. The method as claimed in claim 21, wherein the receiving station determines the optimum Nss and MCS in maximum throughput mode, which is for the maximum throughput by turning on all the Tx and Rx antennas in the receiving station and the transmitting station.

23. The method as claimed in claim 21, wherein the receiving station determines the optimum Nss and MCS in normal mode, which is for compromising of the power saving and the throughput by turning on partial set of Tx and RX antennas in the receiving station and the transmitting station.

24. The method as claimed in claim 21, wherein the receiving station determines the optimum Nss and MCS in power saving mode, which is for the maximum power saving by turning on minimally required set of Tx and Rx antennas in the receiving station and the transmitting station for the current data rate.

* * * * *